US010521508B2

(12) United States Patent
Bateman et al.

(10) Patent No.: US 10,521,508 B2
(45) Date of Patent: Dec. 31, 2019

(54) NATURAL LANGUAGE PROCESSING FOR EXTRACTING CONVEYANCE GRAPHS

(71) Applicant: TitleFlow LLC, Lubbock, TX (US)

(72) Inventors: David T. Bateman, Ransom Canyon, TX (US); Aaron Phillips, Lubbock, TX (US); Andrew E. Plagens, Midland, TX (US); J. Charles Drennan, Lubbock, TX (US); Wendell H. Langdon, San Antonio, TX (US)

(73) Assignee: TitleFlow LLC, Lubbock, TX (US)

( * ) Notice: Subject to any disclaimer, the term of this patent is extended or adjusted under 35 U.S.C. 154(b) by 0 days.

(21) Appl. No.: 14/984,444

(22) Filed: Dec. 30, 2015

(65) Prior Publication Data
US 2016/0117312 A1    Apr. 28, 2016

Related U.S. Application Data

(63) Continuation of application No. 14/681,719, filed on Apr. 8, 2015, now Pat. No. 9,251,139.
(Continued)

(51) Int. Cl.
*G06F 17/27* (2006.01)
*G06F 17/21* (2006.01)
(Continued)

(52) U.S. Cl.
CPC ......... *G06F 17/2765* (2013.01); *G06F 16/29* (2019.01); *G06F 16/3344* (2019.01);
(Continued)

(58) Field of Classification Search
USPC ... 705/1.1, 4, 7.44, 7.27–7.28, 14.11, 30–45, 705/310–316, 342
See application file for complete search history.

(56) References Cited

U.S. PATENT DOCUMENTS 5,680,511 A * 10/1997 Baker ................ G10L 15/1815
704/257
5,704,045 A * 12/1997 King ...................... G06Q 40/00
705/35

(Continued)

OTHER PUBLICATIONS

RFFlow, "Landman chain of title flow chart", retrieved from "www.archive.org", the document was archived on Jun. 8, 2012.*

*Primary Examiner* — Jialong He
(74) *Attorney, Agent, or Firm* — Pillsbury Winthrop Shaw Pittman, LLP

(57) ABSTRACT

Provided is a process for extracting conveyance records from unstructured text documents, the process including: obtaining, with one or more processors, a plurality of documents describing, in unstructured form, one or more conveyances of interest in real property; determining, with one or more processors, for each of the documents, a respective jurisdiction; selecting, with one or more processors, from a plurality of language processing models for the English language, a respective language processing model for each of the documents based on the respective determined jurisdiction; extracting, with one or more processors, for each of the documents, a plurality of structured conveyance records from each of the plurality of documents by applying the language processing model selected for the respective document based on the jurisdiction associated with the document; and storing, with one or more processors, the extracted, structured conveyance record in memory.

26 Claims, 10 Drawing Sheets

US 10,521,508 B2
Page 2

Related U.S. Application Data

(60) Provisional application No. 61/976,929, filed on Apr. 8, 2014.

(51) Int. Cl.

| | | |
|---|---|---|
| *G06K 9/00* | (2006.01) | |
| *G06Q 30/06* | (2012.01) | |
| *G06Q 30/00* | (2012.01) | |
| *G06Q 50/16* | (2012.01) | |
| *G06Q 50/02* | (2012.01) | |
| *G10L 21/00* | (2013.01) | |
| *G06F 16/29* | (2019.01) | |
| *G06F 16/951* | (2019.01) | |
| *G06F 16/33* | (2019.01) | |
| *G06F 17/22* | (2006.01) | |
| *G06F 17/24* | (2006.01) | |
| *G06Q 50/00* | (2012.01) | |

(52) U.S. Cl.
CPC ............ *G06F 16/951* (2019.01); *G06F 17/21* (2013.01); *G06F 17/2235* (2013.01); *G06F 17/24* (2013.01); *G06F 17/27* (2013.01); *G06F 17/2785* (2013.01); *G06K 9/00456* (2013.01); *G06K 9/00483* (2013.01); *G06Q 30/018* (2013.01); *G06Q 30/0645* (2013.01); *G06Q 50/02* (2013.01); *G06Q 50/163* (2013.01); *G06Q 50/165* (2013.01); *G10L 21/00* (2013.01); *G06Q 50/00* (2013.01)

(56) References Cited

U.S. PATENT DOCUMENTS

| | | | | |
|---|---|---|---|---|
| 6,374,217 B1* | 4/2002 | Bellegarda | .......... | G10L 15/1815 704/240 |
| 6,418,431 B1* | 7/2002 | Mahajan | .......... | G06F 17/30687 |
| 6,629,081 B1* | 9/2003 | Cornelius | .......... | G06Q 20/04 705/30 |
| 6,714,939 B2* | 3/2004 | Saldanha | .......... | G06F 17/2229 |
| 6,724,927 B2* | 4/2004 | Jones | .......... | G06K 9/033 382/135 |
| 7,069,234 B1* | 6/2006 | Cornelius | .......... | G06Q 20/10 705/26.35 |
| 7,698,340 B2* | 4/2010 | Ye | .......... | G06F 17/242 707/755 |
| 7,734,092 B2* | 6/2010 | Curtis | .......... | G06K 9/6292 358/462 |
| 8,140,421 B1* | 3/2012 | Humphries | .......... | G06Q 20/10 705/313 |
| 8,209,232 B2* | 6/2012 | Callow | .......... | G06Q 30/0241 705/26.1 |
| 8,219,423 B2* | 7/2012 | Hersch | .......... | G06Q 40/00 705/35 |
| 8,375,061 B2* | 2/2013 | Aggarwal | .......... | G06F 16/316 707/798 |
| 8,442,921 B2* | 5/2013 | Wohlstadter | .......... | G06Q 40/00 705/313 |
| 8,443,278 B2* | 5/2013 | Mansfield | .......... | G06F 17/211 715/227 |
| 8,682,649 B2* | 3/2014 | Bellegarda | .......... | G06F 17/2785 704/10 |
| 8,769,438 B2* | 7/2014 | Mangum | .......... | G06F 3/0488 715/784 |
| 8,868,479 B2* | 10/2014 | Mitchell | .......... | G06F 17/2705 706/46 |
| 8,972,240 B2* | 3/2015 | Brockett | .......... | G06F 17/2229 704/9 |
| 9,251,413 B2* | 2/2016 | Meier | .......... | G06K 9/00463 |
| 9,477,759 B2* | 10/2016 | Keysar | .......... | G06F 16/9535 |
| 2002/0032626 A1* | 3/2002 | DeWolf | .......... | G06Q 10/06 705/35 |
| 2002/0103834 A1* | 8/2002 | Thompson | .......... | G06F 17/277 715/256 |
| 2002/0116194 A1* | 8/2002 | Lewis | .......... | G10L 15/197 704/257 |
| 2002/0123880 A1* | 9/2002 | Brown | .......... | G06F 17/2827 704/4 |
| 2002/0124109 A1* | 9/2002 | Brown | .......... | G06F 17/24 709/246 |
| 2002/0198736 A1* | 12/2002 | Harrison | .......... | G06Q 30/02 705/51 |
| 2002/0198817 A1* | 12/2002 | Dhir | .......... | G06Q 40/04 705/37 |
| 2003/0004716 A1* | 1/2003 | Haigh | .......... | G10L 15/10 704/238 |
| 2003/0023539 A1* | 1/2003 | Wilce | .......... | G06F 17/24 705/37 |
| 2003/0036922 A1* | 2/2003 | Fries | .......... | G06Q 10/10 705/316 |
| 2003/0055655 A1* | 3/2003 | Suominen | .......... | G06F 3/167 704/276 |
| 2003/0105687 A1* | 6/2003 | Bross | .......... | G06Q 40/02 705/31 |
| 2003/0149526 A1* | 8/2003 | Zhou | .......... | G01S 5/0027 701/408 |
| 2003/0195780 A1* | 10/2003 | Arora | .......... | G06Q 10/06 705/35 |
| 2004/0019508 A1* | 1/2004 | Yaruss | .......... | G06Q 40/08 705/4 |
| 2004/0019557 A1* | 1/2004 | Yaruss | .......... | G06Q 40/08 705/38 |
| 2004/0044696 A1* | 3/2004 | Frost | .......... | G06Q 10/10 |
| 2004/0054888 A1* | 3/2004 | Chester | .......... | G06Q 30/06 713/155 |
| 2004/0059653 A1* | 3/2004 | Verkuylen | .......... | G06Q 40/02 705/35 |
| 2004/0102957 A1* | 5/2004 | Levin | .......... | G06F 17/2735 704/3 |
| 2004/0113908 A1* | 6/2004 | Galanes | .......... | H04M 1/72561 345/418 |
| 2004/0230572 A1* | 11/2004 | Omoigui | .......... | G06F 17/30528 |
| 2005/0091059 A1* | 4/2005 | Lecoeuche | .......... | H04M 1/72561 704/270.1 |
| 2005/0210009 A1* | 9/2005 | Tran | .......... | G06Q 10/10 |
| 2005/0210046 A1* | 9/2005 | Brunecky | .......... | G06F 17/271 |
| 2005/0210047 A1* | 9/2005 | Hayes | .......... | G06F 17/30557 |
| 2005/0210048 A1* | 9/2005 | Beres | .......... | G06F 17/30569 |
| 2005/0210068 A1* | 9/2005 | Szymanski | .......... | G06Q 10/08 |
| 2005/0246353 A1* | 11/2005 | Ezer | .......... | G06F 17/2247 |
| 2006/0026136 A1* | 2/2006 | Drucker | .......... | G06Q 50/16 |
| 2006/0104511 A1* | 5/2006 | Guo | .......... | G06K 9/00469 382/176 |
| 2006/0143220 A1* | 6/2006 | Spencer, Jr. | .......... | G06F 8/20 |
| 2006/0238379 A1* | 10/2006 | Kimchi | .......... | G01C 21/26 340/995.1 |
| 2006/0242180 A1* | 10/2006 | Graf | .......... | G06F 16/86 |
| 2007/0078665 A1* | 4/2007 | Dodson | .......... | G06Q 30/0601 705/26.1 |
| 2007/0214096 A1* | 9/2007 | Newman | .......... | G06Q 10/10 705/80 |
| 2007/0219818 A1* | 9/2007 | Duthler | .......... | G06Q 10/06 705/45 |
| 2007/0226004 A1* | 9/2007 | Harrison | .......... | G06Q 10/00 705/26.1 |
| 2008/0084573 A1* | 4/2008 | Horowitz | .......... | G06F 17/2229 358/1.13 |
| 2008/0109756 A1* | 5/2008 | Stambaugh | .......... | G06F 17/3087 715/835 |
| 2008/0120129 A1* | 5/2008 | Seubert | .......... | G06Q 10/06 705/35 |
| 2008/0167883 A1* | 7/2008 | Thavildar Khazaneh | .......... | G06Q 30/018 705/1.1 |
| 2008/0222014 A1* | 9/2008 | Thompson | .......... | G06Q 10/10 705/35 |
| 2008/0228789 A1* | 9/2008 | Asakawa | .......... | G06F 17/2247 |

(56) References Cited

U.S. PATENT DOCUMENTS

| | | | |
|---|---|---|---|
| 2010/0057586 A1* | 3/2010 | Chow | G01S 19/14 705/26.1 |
| 2010/0106651 A1* | 4/2010 | Tate | G06Q 10/10 705/80 |
| 2010/0125527 A1* | 5/2010 | Wolfond | G06Q 10/10 705/316 |
| 2010/0153318 A1* | 6/2010 | Branavan | G06F 17/30705 706/12 |
| 2010/0169359 A1* | 7/2010 | Barrett | G06F 17/30616 707/769 |
| 2010/0312712 A1* | 12/2010 | Salzmann | G06Q 20/3676 705/316 |
| 2010/0332546 A1* | 12/2010 | Chowdhury | G06F 16/83 707/797 |
| 2011/0025842 A1* | 2/2011 | King | G06F 17/211 348/135 |
| 2011/0055206 A1* | 3/2011 | Martin | G06F 17/2775 707/723 |
| 2011/0098999 A1* | 4/2011 | Amini | G06F 17/2809 704/2 |
| 2011/0125393 A1* | 5/2011 | Williams | G06Q 30/0273 701/532 |
| 2011/0238566 A1* | 9/2011 | Santos | G06Q 40/025 705/38 |
| 2011/0288962 A1* | 11/2011 | Rankin, Jr. | G06F 17/30525 705/27.1 |
| 2011/0289161 A1* | 11/2011 | Rankin, Jr. | G06Q 10/107 709/206 |
| 2012/0030124 A1* | 2/2012 | Cronkright, II | G06Q 10/06 705/316 |
| 2012/0109651 A1* | 5/2012 | Chen | G06F 17/30616 704/240 |
| 2012/0239538 A1* | 9/2012 | Moore | G06Q 10/025 705/31 |
| 2012/0254045 A1* | 10/2012 | Orfano | G06Q 30/06 705/306 |
| 2013/0096911 A1* | 4/2013 | Beaufort | G06F 17/273 704/9 |
| 2013/0132289 A1* | 5/2013 | Agnew | G06Q 50/16 705/313 |
| 2013/0262106 A1* | 10/2013 | Hurvitz | G10L 15/183 704/235 |
| 2013/0282524 A1* | 10/2013 | Appolito | G06Q 30/0613 705/26.41 |
| 2014/0025548 A1* | 1/2014 | Serio | G06Q 40/02 705/35 |
| 2014/0223284 A1* | 8/2014 | Rankin, Jr. | G06F 17/241 715/234 |
| 2014/0258143 A1* | 9/2014 | Laroche | G06Q 50/184 705/310 |
| 2014/0278479 A1* | 9/2014 | Wang | G06F 19/328 705/2 |
| 2014/0279583 A1* | 9/2014 | Surdeanu | G06Q 50/184 705/310 |
| 2014/0316908 A1* | 10/2014 | Kalra | G06Q 50/165 705/14.73 |
| 2014/0358764 A1* | 12/2014 | Becker | G06Q 30/08 705/37 |
| 2015/0058234 A1* | 2/2015 | Dozier | G06T 11/206 705/315 |
| 2015/0178853 A1* | 6/2015 | Byron | G06Q 40/12 705/30 |
| 2015/0286630 A1* | 10/2015 | Bateman | G06F 17/30241 704/9 |

\* cited by examiner

| File | Tools | Insert | Reports | Help |
|---|---|---|---|---|
| +Add New Inst. | −Delete Instrument | +Add from Databas | Toggle Tracts | Rename Tract |

Quick Chain (General)
Tract 1: All Sec. 4 (S&E Tract 2) ← 310

| Instrument Title: General Warranty Deed | | | | |
|---|---|---|---|---|
| Inst. Type: | Deed | Vol.: | Pg.: | Record: OPR |
| Grantor: | T.L. Fidel | | Grantee: | Weezy F. |
| Enter Interest Conveyed: | | =(1/2)*(1/2) | | =0.250000 |
| Legal Desc.: | | | | |
| Exec/Eff. Date: | 01/12/1925 | | Reservations: | No |
| Recorded: | 02/19/1925 | | Duration: | Perpetual |
| ☐Split Tract | Tracts Affected | | | |
| Cover Add'l Lands: Yes/No | | | | |
| Tag Image: | Image File Menu | Tag Note to Subsequent: | | Yes/No |
| Comments: Acknowledgment was not properly notarized. | | | | |
| ADD INSTRUMENT | | | | |

Roster:
T.L. Fidel 0.7500000
Weezy F. 0.2500000

Total: 1.00000

FIG. 3A

Section 1, Block A-1, Public School Land Survey, A12000, Lubbock County, Texas, From Sovereignty of the Soil to November/20, 2013, at 5 p.m.

| Instrument # | A-2000 | Image | Instrument Type(s) | Record Type | Volume | Page | Grantor(s) | Grantee(s) |
|---|---|---|---|---|---|---|---|---|
| 1 | All | Image | Patent | PR | 2 | 251 | State of Texas | A |
| 2 | All | Image | General Warranty Deed | DR | 7 | 444 | A | B |
| 3 | W2 | Image | Deed | DR | 9 | 103 | B | C |
| 4 | W2 | Image | Deed | DR | 11 | 231 | C | D |
| 5 | W2 | Image | Oil and Gas Lease | DR | 13 | 391 | C | Big Oil |
| 6 | All | Image | Probate | PROB | 2 | 45 | In Re Estate of B | |
| 7 | W2 | Image | Mineral Deed | DR | 20 | 145 | C | G |
| 8 | W2 | Image | Release of Oil and Gas Lease | DR | 21 | 391 | Big Oil | C |
| 9 | All | Image | Deed | DR | 23 | 632 | F | E |
| 10 | E2 | Image | Royalty Deed | DR | 27 | 61 | E | F |
| 11 | All | Image | Mineral Deed | DR | 27 | 63 | G | F |
| 12 | All | Image | Deed | DR | 28 | 210 | E | H |
| 13 | All | Image | Oil and Gas Lease | DR | 41 | 510 | F,G, and H | Big Oil |
| 14 | All | Image | Oil and Gas Lease | DR | 42 | 1 | C | Little Oil |
| 15 | All | Image | Assignment of Oil and Gas Lease | DR | 43 | 1 | Little Oil | Big Oil |

FIG. 4A

| Section 1, Block A-1, Public School Land Survey, A12000, Lubbock County, Texas, From Sovereignty of the Soil to November 20, 2013, at 5 p.m. | | | | | |
|---|---|---|---|---|---|
| Interest | Execution Date | Effective Date | Filing Date | Document Problems/Notes | Title Note(s) |
| All of Section 1 | 1/1/1910 | 1/1/1909 | 5/1/1910 | None | Patent |
| All of Section 1 | 11/20/1920 | 11/20/1920 | 11/21/1920 | No Mineral Reservations | Patent |
| W2 Sec. 1 | 4/3/1923 | 4/3/1923 | 4/4/1923 | Reserved Undivided 1/2 M1 in W2 | Patent |
| W2 Sec. 1 | 6/20/1927 | 6/20/1927 | 4/25/1931 | Reserved A11 OGM | Patent |
| W2 Sec. 1 | 6/2/1930 | 6/2/1930 | 2/23/1931 | 1/8 Roy. 10 yr. PT | Patent |
| All of E2 and ½ MI in W2 | 3/11/1931 | 3/11/1931 | 3/23/1931 | Went in equal shares to his three children E.F.G. | Patent |
| 1/2 of Grantor's Mineral Interest in W2 | 11/17/1933 | 11/17/1933 | 12/10/1938 | None | Patent |
| W2 Sec. 1 | 3/20/1935 | 3/20/1935 | 3/21/1935 | Release of OGL 13-391 | Patent |
| All right title and interest E2 and W2 | 3/23/1935 | 3/23/1935 | 4/6/1935 | None | Patent |
| 1/16 Non-Participating Royalty Interest in the E2 Only | 4/10/1935 | 4/10/1935 | 6/3/1935 | None | Patent |
| 1/3 of Grantor's Mineral Interest | 4/29/1935 | 4/29/1935 | 6/3/1935 | It is 1/3 of Grantor's Mineral Interest in both the W2 and E2 | Patent |
| All right title and interest E2 and W2 | 8/28/1937 | 8/28/1937 | 8/31/1937 | Takes Subject to NPRI in Instrument Number 10 | Patent |
| E2 and W2 | 7/6/1941 | 7/6/1941 | 7/8/1941 | 22.5% Roy, 3 yr. PT, E2 and W2 | Patent |
| 1/4 in W2 | 7/15/1941 | 7/15/1931 | 7/16/1941 | 1/5 Roy, 3 yr. PT, E2 and W2 | Patent |
| ART1 in Oil and Gas Lease 42-1 | 7/20/1941 | 7/20/1941 | 7/21/1941 | Reserved 1% ORRI | Patent |

FIG. 4B

What would you like to do?
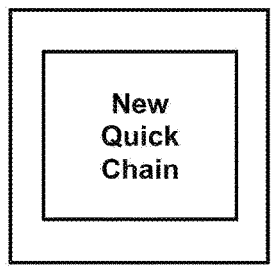 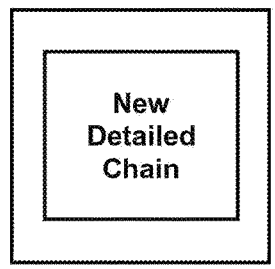 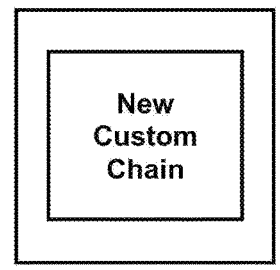
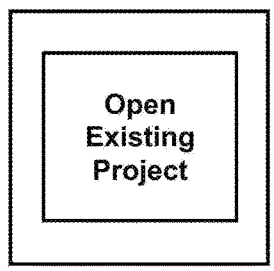 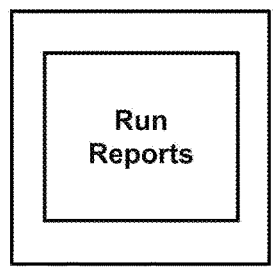 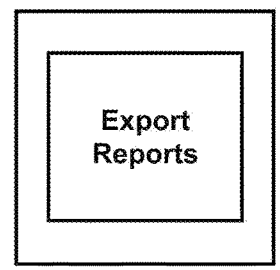
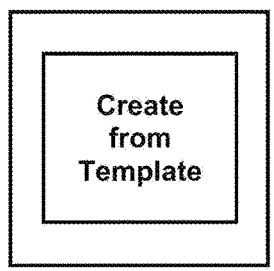 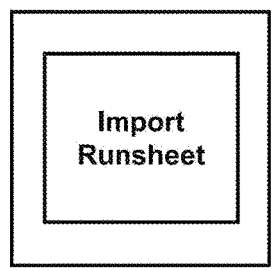 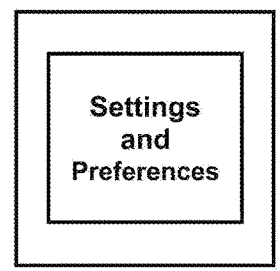
FIG. 5

NATURAL LANGUAGE PROCESSING FOR EXTRACTING CONVEYANCE GRAPHS

CROSS-REFERENCE TO RELATED APPLICATIONS

The present application is a continuation of U.S. patent application Ser. No. 14/681,719, filed Apr. 8, 2015, having the same title as this application, which claims the benefit of U.S. Provisional Patent Application 61/976,929, filed on Apr. 8, 2014, each of which is hereby incorporated by reference in entirety.

BACKGROUND

1. Field

The present invention relates generally to computer systems and, more specifically, to real property rights management systems and methods.

2. Description of the Related Art

Determining mineral rights to a plot of land can be a lengthy and costly process that involves multiple parties. Each party often analyzes hundreds, and sometimes thousands, of documents, such as deeds, wills, leases, and the like, in the process, with little-to-no coordination between the parties, who as a result often duplicate analyses. Generally, determining mineral rights to a plot of land is accomplished in several, relatively labor-intensive steps. A first step is examination of the county records to ascertain the mineral rights. In the process, a "landman" creates a "runsheet" which is often an Excel™ spreadsheet listing the relevant information of documents filed with the county clerk's office that are a conveyance of a fee mineral interest. There are different methods of keeping track of the ownership, including Excel™ spreadsheets and manually drawn flowcharts, often used in combination. After examination of the county records, the landman creates a mineral ownership report (MOR).

The process often also includes examination of the title and preparation of an original drilling title opinion by an attorney. In this step, the attorney examines the documents that affect the subject land. A second "landman" often prepares an abstract, which is a runsheet that lists instruments affecting the subject land, and makes an electronic copy of each instrument. The attorney generally prepares the original drilling title opinion based on the abstract and the runsheet. Similar to the landman that prepared the MOR, a title attorney will often either use an Excel™ spreadsheet or a hand-drawn, color-coded flowchart drawn out on butcher paper, commonly referred to as a "title flow."

SUMMARY

The following is a non-exhaustive listing of some aspects of the present techniques. These and other aspects are described in the following disclosure.

Some aspects include a process of extracting conveyance records from unstructured text documents. The process, in these aspects, includes: obtaining a plurality of scanned, optical-character-recognized (OCR) documents, each having OCR-produced English language text describing, in unstructured form, one or more conveyances of interest in real property, wherein each document is associated with metadata identifying a jurisdiction in which the respective real property is located; determining for each of the documents, a respective jurisdiction based on the metadata; selecting from a plurality of language processing models for the English language, a respective language processing model for each of the documents based on the respective determined jurisdiction, wherein a first language processing model is selected for at least some of the documents associated with a first jurisdiction and a second language processing model, different from the first language processing model, is selected for at least some of the documents associated with a second jurisdiction that is different from the first jurisdiction, and wherein each language processing model is configured to extract structured data from unstructured text, and wherein each language processing model is configured to detect different terminology used in different jurisdictions with different frequencies; extracting for each of the documents, from the respective OCR-produced English language text describing, in unstructured form, one or more conveyances of interest in real property, a plurality of structured conveyance records from each of the plurality of documents by applying the language processing model selected for the respective document based on the jurisdiction associated with the document, wherein each extracted conveyance record identifies a plot of land in which an interest is conveyed by the respective document, identifies a grantor of the conveyance, identifies an grantee of the conveyance, and identifies the interest conveyed; and storing the extracted, structured conveyance record in memory.

Some aspects include a tangible, non-transitory, machine-readable medium storing instructions that, when executed by a data processing apparatus, cause the data processing apparatus to perform operations including the above-mentioned process.

Some aspects include a system, one or more processors and memory storing instructions that, when executed by the processors, cause the processors to effectuate operations of the above-mentioned process.

BRIEF DESCRIPTION OF THE DRAWINGS

The above-mentioned aspects, and other aspects of the present techniques, will be better understood when the present application is read in view of the following figures in which like numbers indicate similar or identical elements:

FIG. 3A shows an example of a portion of a graphical user interface from FIG. 2A after adding a conveyance record;

FIG. 4A shows a first part of an example of conveyance records in the form of an example runsheet;

FIG. 4B shows a second part of the example runsheet of FIG. 4A;

FIG. 5 shows an example of a graphical user interfaces associated with computing environment 100 of FIG. 1, in accordance with some implementations of the system of FIG. 1;

Figure 1:
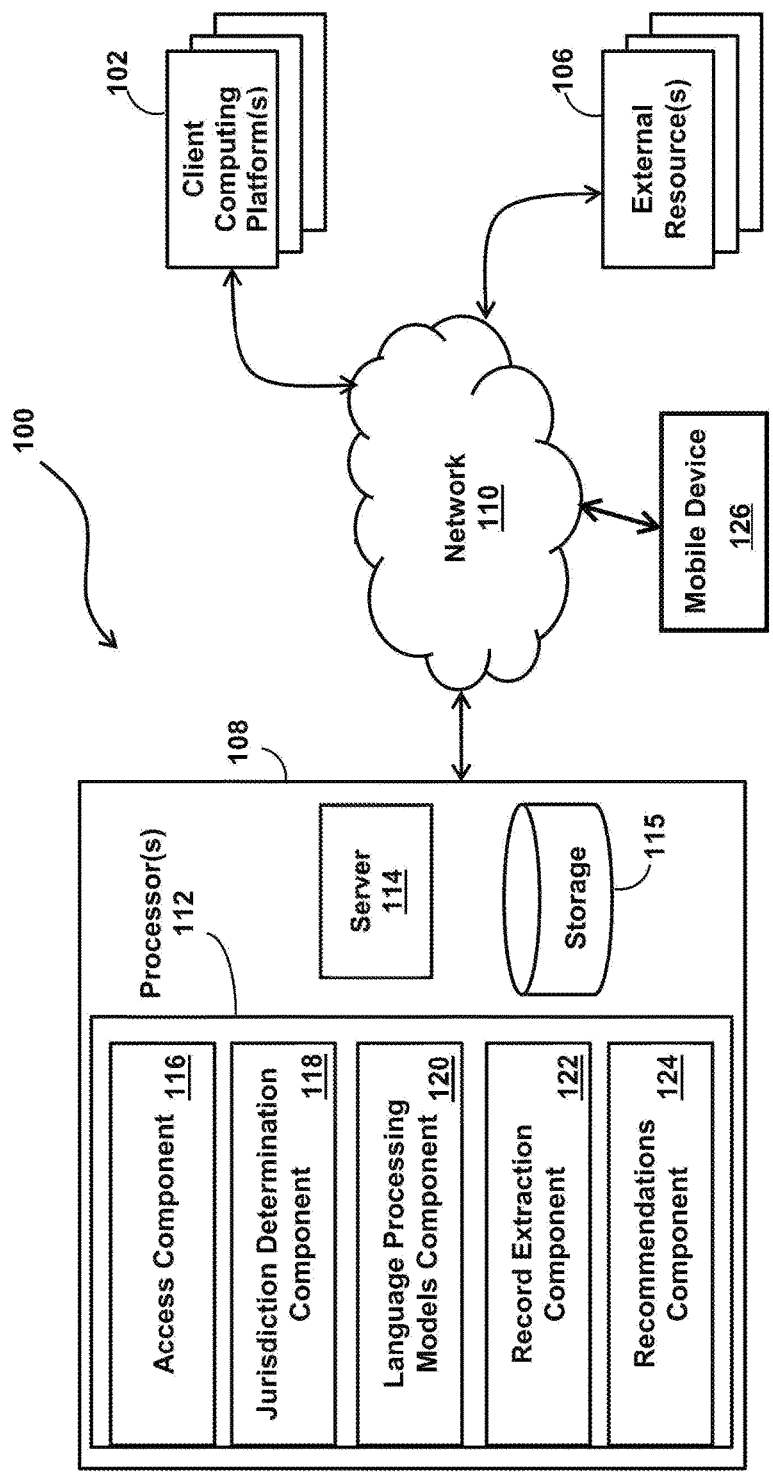
FIG. 1 shows an example of a system configured to extract conveyance records from unstructured text documents consistent with the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 illustrates a computing environment 100 having a mineral-rights management system 108 configured, in some cases, to facilitate re-use and sharing of analyses of mineral rights and, in some cases, to expedite such analyses by programmatically extracting some or all of conveyance records from unstructured text documents. In some cases, such extractions may be based on a natural language processing (NLP) language model selected according to a jurisdiction in which land at issue is disposed, a selection which is expected to yield relatively accurate extractions according to models trained on terminology used in various jurisdictions. Extracted information may be presented in a manner that expedites review and revision by a human reviewer, e.g., with links to excerpts or relevant portions of governing documents. Further, some embodiments facilitate re-use of analyses and collaboration between system users by translating conveyance records into (and in some cases from) a standardized format, such that different, otherwise inoperable systems may exchange data about mineral rights. That said, not all embodiments necessarily provide all of these benefits, as several independently useful inventions are described, e.g., some systems may facilitate re-use of analyses without implementing language processing models, or vice versa, and some embodiments may provide other distinct advantages, which is not to suggest that any other feature described herein may not also be omitted in some embodiments.

In some embodiments, as shown in this example, computing environment 100 may include one or more of client computing platform(s) 102, one or more external resources 106, one or more mineral-rights management system 108, and/or other components, all being communicatively coupled via a network 110.

The network 110 may include the Internet and/or other networks, such as local area networks, cellular networks, Intranets, near field communication, frequency (RF) link, Bluetooth™, Wi-Fi™, and/or any type(s) of wired or wireless network(s). Such examples are not intended to be limiting, and the scope of this disclosure includes embodiments in which the client computing platform(s) 102, the external resource(s) 106, and/or the mineral-rights management system 108 are operatively linked via some other communication media, which is not to suggest that other enumerated examples are limiting.

The client computing platform(s) 102 may include one or more processors configured by machine-readable instructions to execute computer program components. The computer program components may be configured to enable one or more users associated with the client computing platform (s) 102 to interface with computing environment 100, external resource(s) 106, and/or mineral-rights management system 108, and/or provide other functionality attributed herein to client computing platform(s) 102. By way of non-limiting example (which is not to imply other examples are limiting), client computing platform(s) 102 may include desktop computers, laptop computers, handheld computers, netbooks, tablets, smartphones, smartwatches, personal digital assistants (PDAs), cellular telephones, personal computers (PCs), and/or other computing platforms.

Client computing platform(s) 102 may include one or more physical interfaces. A physical interface included in client computing platform(s) 102 may be configured to provide an interface between mineral-rights management system 108 (and/or other components of computing environment 100) and a user of client computing platform(s) 102 through which the user may provide information to and/or receive information from mineral-rights management system 108 (and/or other components of computing environment 100). This facilitates data, results, reports, recommendations, and/or instructions and other communicable items, collectively and individually examples of "information," being communicated between the user and mineral-rights management system 108 (and/or other components of computing environment 100).

Examples of interface devices suitable for inclusion in a physical interface of the client computing platform(s) 102 include one or more of a keypad, buttons, switches, a keyboard, knobs, levers, a display screen, a track pad, a touch screen, speakers, a microphone, an indicator light, an audible alarm, a printer, and/or other interfaces through which the user may provide and/or receive information. It is to be understood that other communication techniques, either hardwired or wireless, are also contemplated as a physical interface of the client computing platform(s) 102. As such, a variety of techniques for communicating information with mineral-rights management system 108 and/or other components of the computing environment 100 are contemplated by the present disclosure as a physical interface of client computing platform(s) 102.

The external resource(s) 106 may include sources of information, hosts and/or providers of information and/or services outside of the system 108, external entities participating with the computing environment 100 (e.g., cloud storage), and/or other resources. In some embodiments, some or all of the functionality attributed herein to external resources 106 may be provided by resources included in the computing environment 100.

The mineral-rights management system 108 may include electronic storage 115, one or more processors 112, and/or other components. Mineral-rights management system 108 may include communication lines, components, or ports to enable the exchange of information with a network and/or client computing platform(s) 102. Illustration of mineral-rights management system 108 in FIG. 1 is not intended to be limiting. Mineral-rights management system 108 may include a plurality of hardware, software, and/or firmware components operating together to provide the functionality attributed herein to mineral-rights management system 108. For example, mineral-rights management system 108 may be implemented by a cloud of computing platforms operating together as mineral-rights management system 108.

Electronic storage 115 may be configured to store extracted structured conveyance records in accordance with one or more embodiments described hereinafter. Electronic storage 115 may comprise electronic storage media that electronically stores information. The electronic storage media of electronic storage 115 may include one or both of system storage that is provided integrally (i.e., substantially non-removable) with server(s) 108 and/or removable storage that is removably connectable to server(s) 108 via, for example, a port (e.g., a USB port, a firewire port, etc.) or a drive (e.g., a disk drive, etc.). Electronic storage 115 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 115 may include one or more virtual storage resources (e.g., cloud storage, a virtual private network, and/or other virtual storage resources). Electronic storage 115 may store software algorithms, information determined by processors 112, information received from client computing platform(s) 102, and/or other information that enables mineral-rights management system 108 to function as described herein.

Processor(s) 112 may be configured to provide information-processing capabilities in mineral-rights management system 108. As such, processor(s) 112 may include one or more of a digital processor, an analog processor, a digital circuit designed to process information, an analog circuit designed to process information, a state machine, and/or other mechanisms for electronically processing information. Although processor(s) 112 is shown in FIG. 1 as a single entity, this is for illustrative purposes only. In some embodiments, processor(s) 112 may include one or more processing units. The processing units may be physically located within the same device, or processor(s) 112 may represent processing functionality of a plurality of devices operating in coordination.

Processor(s) 112 may be configured by machine-readable instructions to execute one or more computer program components. The one or more computer program components may include one or more of an access component 116, a jurisdiction determination component 118, a language processing models component 120, a record extraction component 122, a recommendations component 124, and/or other components.

The illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium.

Some embodiments may include a server 114 operative to interface with client computing platforms (e.g., devices) 102 and expose the data and interfaces described herein. In some cases, the server 114 is a web server configured to interface with a client-side web browser and/or an application program interface server operative to interface with a client-side native application.

The server 114, in some cases, may receive user requests to create title flows, view title flows, edit title flows, and export title flows. In some cases, upon receiving a request to create a new title flow, some embodiments may perform the steps described below with reference to FIG. 7, engaging some of the components 116-124 of the mineral-rights management system 108. In some embodiments, the server 114 may then apply various ownership graph validity rules described below (e.g., flagging conveyances in which the grantor did not own what was conveyed, or cases where 100% ownership of a type of interest is not documented).

In some cases, the server 114 may send client computing platform(s) 102 instructions to depict one or more of various representations of the resulting conveyance records and violations of ownership graph rules, such as those shown in FIGS. 2 and 3. In some embodiments, user edits to the ownership graph may be received, e.g., to correct an incorrect extraction of the type of a conveyance. In response, the server 114 may update the corresponding records, the ownership graph validity rules may be re-run, and instructions to display an updated view, possibly clearing indications that rules were violated, may be sent to the client device 102.

In some cases, the server 114 may be further operative to export records documenting ownership in a standardized format, or translation from a standardized format to formats suitable for various client side systems. Some embodiments may be configured to export title flows into various land management platforms or into oil and gas accounting platforms, e.g., as entries corresponding to a division order indicating allocations to various royalty interest holders, or as a segment of a title opinion, for instance, with ownership schedules, effective oil and gas leases, effective deeds of trusts, easements, unreleased oil and gas leases, comments on the runsheet, assignment history, and title history.

In some cases, data may be imported by server 114, or exported from server 114, via an application program interface (API) exposed by server 114. For instance, some embodiments may receive an API request for records (e.g., conveyance records) pertaining to a geographic area (e.g., a particular lot of land), a particular set of one or more of rights associated with the land, and/or (e.g., a combination thereof) a particular grantor or grantee. In response, some embodiments of server 114 may retrieve responsive conveyance records and send those records in a machine-readable format, e.g., in a serialized data format, such as in key-value pairs encoded in JavaScript™ object notation (JSON) or extensible markup language (XML). In some cases, an API request may specify a format to which the requesting system is responsive, and some embodiments may translate records into a corresponding format before transmission. Thus, some embodiments may provide for relatively low-cost, fast import and export of data between the present system and other users of related data. That said, not all embodiments necessarily provide this benefit, which is not to suggest that other features may not also be omitted in some embodiments.

An example of an API output is encoded in an ASCII text file filed herewith, titled "example-api-out-json.txt," created 8 Apr. 2015, having 3,146 bytes, and which is hereby incorporated by reference in its entirety.

For example, some embodiments may be integrated into (e.g., via communications according to the above-mentioned API) various types of land management systems, including oil-and-gas land management systems and such systems for other industries. In some cases, a land management system may transmit an API request for records pertaining to one or more of the query fields mentioned above, and server 114 may respond with corresponding records in a format suitable for upload into the land management system. Such uploads may include data indicative of when leases or other expiring conveyances are due to expire, and the data may be used by the land management system to alert a user to such dates, e.g., by displaying or sending alarms, populating a calendar, or populating a "tickler" or list of reminders. In other examples, a list of current owners of a particular interest may be ingested by the land management system, e.g., to populate a list of owners from whom leases are to be secured.

In another example, some embodiments may be integrated into various types of real property interest auction (or other market making) systems. For instance, a party may post a request to auction a set of property rights on such as an auction system, and in response, the auction system may submit an API request for conveyance records applicable to the corresponding rights. The responsive records may be displayed in association with the auction in order to facilitate higher bids when bidders have more comfort in the quality of title held, or in some cases, the auction system may determine a suggested price for, or reject, the auction based on the API request response.

In another example, parties engaging in real estate related transactions (including via the above-mentioned integrated systems) may export data to the server 114 via an API exchange. For instance, a party may convey a lease to a buyer, record the transaction in their land management system (or execute the exchange in an auction system), and that system may transmit an API request to add a conveyance record for the land at issue to the system 108.

In another example, a loan underwriting management system may automatically submit API request based on land rights identified in financing applications as collateral. And/or, such systems may submit API requests for the party seeking financing. In some cases, API responses may be automatically ingested by such systems and used to score loans for risk, e.g., risk that party seeking financing does not own the collateral. Similarly, title-insurance underwriting management systems may submit the same or similar requests, to the same or similar ends, when determining whether the insure title in a land right. County land offices may also submit API requests and use retrieved data to populate property abstracts.

In some cases, a party may submit an API (other) request for a binary indication of whether a given person is a grantee in a recorded conveyance record of a given property interest, in some cases without regard to whether title can be traced back to a sovereign entity. In some cases, those seeking to secure leases may wish to operate quickly and such a verification may facilitate efforts to secure an option to lease while title is fully researched.

The API may have a variety of other uses. For instance, in some cases, a party may submit an API request for all owners of a particular type of interest in a particular geographic area, and server 114 may identify leaf nodes of an ownership graph and compose an API response with corresponding lists of owners. Such a response may be used to generate a buy-list for a party seeking to secure rights in a geographic area. In another example, some versions may support an API request for all conveyance records listing a given party as a grantor or grantee. Often, as part of researching title, researchers will seek all conveyances in a given county or state by a party in the title chain to confirm the absence (or existence of) county-wide or state-wide conveyances (e.g., "all of my land in county X"), which may create a new conveyance for the title chain that does not explicitly name the land at issue and only the land at issue. In some cases, embodiments may automatically execute such searches for parties appearing in the title flow and designate parties having a conveyance using certain terms, like "all of my land in county Y," or "all mineral rights held by me in state Y) with a different visual weight in user interfaces. In some cases, such interfaces may include a link to the conveyance causing the issue. Landmen, title attorneys, lease analysts, and others may also use the above-described API to access and update records about conveyances, or such users may use a user interface described below with reference to FIGS. 2 and 3 to view and edit such data. In some cases, API requests may be received from a provider of ancestry records, and responsive conveyances may be used to populate reports on a person's family history.

In some cases, server 114 may determine roles and permissions prior to allowing access. In some cases, embodiments may maintain account records including login credentials and permitted levels of access afforded by the type of subscription and level of access granted within an organization. In some cases, fields of an API request may include such credentials, and embodiments may determine whether the credentials are consistent with the API request before servicing the request.

Embodiments are not limited to tracking mineral rights and include tracking components of mineral rights. For example, embodiments may track real estate generally (e.g., fee simple titles), air rights, water rights, wind rights, surface rights, beach access rights, easements, coal rights, and the like. Mineral rights may be tracked at the level of components, including mineral rights isolated among different depths, type of royalty (non-participating royalty interest, e.g., where the owner is entitled to a royalty and not a bonus), right to execute leases, right to receive bonuses, right to receive delay payments, etc. To track such rights, some embodiments may maintain in memory an ontology of real property related rights, including records of which rights are by default subsets of other rights unless explicitly reserved or conveyed. In some cases, different jurisdictions may be associated with different ontologies according to different default rules, and some embodiments may select a corresponding ontology according to the jurisdiction in which land is disposed in the course of performing analyses described herein.

Various consumers of the API (and systems having other roles) are depicted as external resources 106. The term "external" should not be read to indicate that such systems may not also be integrated with some embodiments. For instance, some embodiments may include a remote land management platform and land auction platform.

Some embodiments of server 114 may support workflow management. For instance, some embodiments may include in memory task lists and parties or roles associated with tasks. In some cases, parties securing land rights may log in to server 114, identify their role, and update such task lists to indicate to others the status of an effort to secure land rights. In some cases, instances of tasks may be associated with conveyance records or ownership graphs created in the course of performing such tasks.

Access component 116 may be configured to obtain one or more unstructured, machine-readable sets of data describing one or more conveyances of interest in real property. In some embodiments, the one or more sets of data may be a plurality of scanned documents. In some embodiments, the plurality of scanned documents may be optical-character-recognized (OCR) documents, each having OCR-produced English language text describing, in unstructured form, one or more conveyances of interest in real property.

In some cases, the documents may be multi-page printable document format (PDF) documents that depict legally operative conveyances of interests in real property. Examples include wills, leases, deeds, easements, deeds of trust, and the like. In some cases, such documents may include text defining parties, such as prose describing a "grantor" conveying an interest (e.g., "John Doe (hereinafter 'Seller')"; prose describing a grantee (e.g., "Mary Smith (hereinafter 'Buyer')"); prose describing a date of conveyance (e.g., "effective Mar. 23, 2001"); prose describing what is being conveyed, like an interest in land (e.g., a fee simple, leasehold, mineral rights, easement, etc.); and prose describing the land at issue (e.g., the metes and bounds, lot number, or latitude and longitude coordinates of vertices of a bounding polygon). In some cases, the documents may be a collection of images obtained with a mobile application described below.

The documents may contain unstructured content, e.g., English language text, that either does not have a pre-defined data model or is not organized in a pre-defined manner. For instance, information relevant to the analysis of land rights (e.g., some or all of such information) may be expressed in the documents in human-composed paragraphs written for purposes of being interpreted by human parties and a court, rather than in labeled key-value pairs or other formats more suitable for extraction by a computer. In many cases, some of the documents may have been composed before the invention of personal or mainframe computers, often dating back to the 1800's. As a result, in some cases, otherwise identical conveyances may be expressed in innumerable different formats in unstructured data, e.g., "party A hereby sells to party B," "party B, in the sale defined herein, purchases from party A," "the Seller (defined above to be party A) hereby conveys to the Buyer (defined above to be party B), in exchange for the purchase price," etc. Extracting relevant parameters of conveyance records from such text can be difficult and is often performed entirely by human reviewers at great expense.

Often such documents are expressed in relatively formal prose, in many cases particular to a jurisdiction, drafting law firm, and time of conveyance, though some jurisdictions, law firms, and times may share some or all of the language used in such documents. In many cases, physical instances of the documents may be obtained from a county land office for a county in which the land at issue is disposed, as parties often record their documents in such repositories to place others on notice of their interest in the land and protect themselves from junior acquirers of such interests. Or these documents may be scanned, e.g., by a county land office or third party hosting such documents as a service. In either case, the documents may be obtainable, in some instances, over network 100 from an external resource 106.

In some embodiments, each (e.g., each, or each and every) document may be associated with metadata identifying a jurisdiction in which the respective real property is located. For instance, a collection of documents pertaining to a particular plot of land may be obtained from an external source, like a third party that scans and hosts content acquired from a county land office by the third party, and that third party may associate the collection of documents with metadata identifying the county land office. In other cases, the metadata may be acquired from the documents themselves, for instance, by parsing such documents, matching parsed tokens to names of counties stored in a dictionary of counties, and associating the document with the name of a detected county.

In some embodiments, access component 116 may be configured to obtain the one or more sets of data from one or more components within computing environment 100. In some embodiments, access component 116 may be configured to obtain the one or more sets of data from users of computing environment 100. In some embodiments, access component 116 may be configured to obtain the one or more sets of data from external sources containing information related to the one or more conveyances of interest in real property. In some cases, a user may request, in a transmission from platform 102 to system 108, an analysis of a particular plot of land identified in the request, and some embodiments of system 108 may respond by composing an application program interface request for relevant documents to one of the external sources, e.g., an API request for documents pertaining to any rights within a polygon defined by latitude and longitude coordinates.

After sending the request, the responsive documents may be received by access component 116. In some cases, access component 116 may be configured to access websites, web platforms, servers, storage mediums, and/or other external sources from where information related to the conveyances of interest in real property may be accessed, obtained, retrieved, and/or requested. Access component 116 may be configured to perform one or more of its functionalities in response to requests from users, components within or outside computing environment 100, and/or other requests. Access component 116 may be located within mineral-rights management system 108, within client computing platform (s) 102, and/or locations within or outside computing environment 100.

Jurisdiction determination component 118 may be configured to determine a respective jurisdiction, and/or date for the one or more, unstructured sets of data describing one or more conveyances of interest in real property obtained by access component 116. The date determined may be a document's execution date, effective, filing date, and/or other date. In some embodiments, jurisdiction determination component 118 may be configured to determine a respective jurisdiction and/or date for each of the documents. Determination of a respective jurisdiction and/or date for each of the documents may be based on the metadata associated with each of the documents. In some embodiments, the jurisdiction and/or date for a given document may be determined, at least in part, by analysis of content of the document. Analysis of content of the document may include analysis of one or more of text, characters, seals, logos, and/or other content of the document from which the jurisdiction and/or date of the document may be extracted. In some embodiments, the jurisdiction and/or date for a given document may be determined, at least in part, based on data obtained from a user, one or more components within and/or outside of computing environment 100, and/or other sources of data. Some embodiments may further determine a law firm or lawyer who prepared the document and select a lawyer-specific or law-firm-specific language model. For instance, some embodiments may search a document for known names of law firms.

In some embodiments, one or more components of computing environment 100 may be configured to determine one or more parameters for the one or more sets of data such that conveyance records for the real property may be extracted from the sets of data based on the determined parameters. Such parameters may include type of instrument (e.g., oil and gas lease, deed of trust, mineral deed, probate, affidavit of heirship, etc.) and/or type of record (e.g., deed record, official public record, etc.). In some cases, a conveyance record may describe a single conveyance of rights from one entity to another, for instance, a record including a name of a grantor, a name of a grantee, a description of the land to which the conveyance pertains (e.g., metes and bounds, a lot number, or a polygon having latitude and longitude vertices), an effective date of the conveyance, an expiration date of the conveyance (e.g., the end of the grantee's life for a life estate), and a type of conveyance (e.g., fee simple, lease, life estate, tenancy in common, etc.). In some cases, a single document may yield several conveyance records, e.g., a grant of tenancy in common in a will to multiple heirs.

In some embodiments, the conveyance records collectively may form an ownership graph, each node being a grantor or grantee, and each edge being a conveyance. In some embodiments, the graph may be a directed graph in the form of a tree, having as a root node a grant from a sovereign entity, and having as leaf nodes a collection of entities (e.g., people or businesses associations) that currently own an interest in the land to which the graph pertains. As explained further below, resulting directed graphs may be interrogated, e.g., programmatically, to flag issues with a title for a human reviewer. In some cases, the leaf nodes may constitute 100% of the interest in the land, or the absence of 100% interest may be detected as indicative of an issue with a title. Some embodiments may sum interests in the leaf nodes for each type of interest, e.g., mineral rights or water rights, and determine whether the interests sum to 100%. Upon detecting less than 100% or more than 100%, some embodiments may designate the interest as problematic and warranting human review in a resulting title analysis.

Language processing models component 120 may be configured to select one or more language processing models for the one or more sets of data obtained by access component 116. The one or more language processing models may be configured to automatically (which is not to imply that other steps herein are not automatic, or that manual steps may not be interspersed with the extraction, e.g., to clear errors, select inputs, etc.) extract structured information from the one or more unstructured, machine-readable sets of data.

In some cases, extracted information may be tokens taken directly from a document at issue. In other cases, such tokens may be translated into a canonical form, e.g., the token "buys" may be extracted as a type of conveyance, but both the token "buys" and "purchases" may be translated into a canonical conveyance type designation of "sale." Some embodiments may store in memory a collection of canonical conveyance types, individual ones of which being associated with a collection of synonymous terms.

The one or more language processing models may take as input the text of a given document and extract parameters of conveyance records. Some embodiments may be configured to account for different terminology used in different jurisdictions with different frequencies. In some embodiments, the one or more language processing models may include language processing models for the English language. In some embodiments, selecting one or more language processing models for individual documents may be based on the determined jurisdiction, law firm, and/or date for the individual documents.

In some embodiments, language processing models may include a first language processing model, and a second language processing model different from the first language processing model. The first language processing model may be selected for at least some of the documents associated with a first jurisdiction, and/or first date. The second language processing model may be selected for at least some of the documents associated with a second jurisdiction that is different from the first jurisdiction and/or a second date that is different from the first date. For example a set of documents obtained by access component 116 may include documents associated with a county in Texas and documents associated with a county in California. Language processing models component 120 may select a first language processing model for the documents associated with the county in Texas, and a second language processing model, different from the first selected language processing model, for the documents associated with the county in California. In some cases, a plurality of documents pertaining to one plot of land may be processed with a first language processing model, and, later, a plurality of documents pertaining to another, different plot of land may be processed with a second language processing model.

In some embodiments, selecting one or more language processing models for individual documents may be based on the one or more parameters determined for the sets of data. For example, a language processing model may be selected based on the type of instruments and/or type of records associated with the sets of data. For example, a language processing model may be selected for a set of data associated with oil and gas leases, a different language processing model may be selected for a set of data associated with deed of trusts, and yet another language processing model may be selected for a set of data associated with mineral deeds.

In some embodiments, language processing models may include natural language processing models configured to extract structured information from human or natural language contained in the one or more sets of data. Natural language processing (NLP) models may be configured for named entity recognition. In some embodiments, an NLP model may be configured to extract proper names from the unstructured sets of data and the type of the extracted names (e.g., person, location, and/or organization). In some embodiments, an NLP model may be configured to identify the relationships among named entities (e.g., who is the wife of whom). In some embodiments, an NLP model may be configured for co-reference resolution (e.g., determine which words refer to the same objects in a set of unstructured data).

For example, to identify named entities, some embodiments may parse tokens from the document, select pairs of tokens with capitalized first characters, select additional adjacent tokens that are capitalized (e.g., in cases where a middle name is used), and determine whether the resulting candidate selections are relevant names. Names may be detected, in some cases, based on certain terminology (e.g., tokens or strings of tokens) appearing within a threshold number of tokens, such as terminology mapping the candidate name to a role in a conveyance, e.g., "Mary M. Smith, hereafter Grantor" includes three capitalized tokens with terms defining a role within less than five tokens. Some embodiments may, after identifying candidate names, identify candidate roles and then compare distances therebetween to select a conveyor name and a conveyee name. In cases where multiple candidate names are detected, some embodiments may associate the candidates with a corresponding conveyance record field, and a human reviewer may select among the candidates during human review. The received selection, upon receipt, may be applied to the corresponding conveyance record.

Some embodiments may identify dates in documents as candidate dates upon which a conveyance is effective. For instance, some embodiments may determine whether names of months are adjacent numbers, or some embodiments may apply a regular expression, such as "^(19|20)\d\d[-/.](0[1-9]|1[012])[-/.](0[1-9]|[12][0-9]|3[01])$" and "^(0[1-9]|1[012])[-/.](0[1-9]|[12][0-9]|3[01])[-/.](19|20)\d\d$" to detect various date formats. A list of candidate dates may be obtained, and embodiments may select among the candidate dates based on adjacent tokens indicative of the purpose of the date, e.g., the text "effective Mar. 3, 1997 Seller sells" includes the text "effective" within less than five tokens of a date, indicating that the date is likely an effective date of a conveyance. In cases, where multiple candidate dates are detected, some embodiments may associate the candidates with a corresponding conveyance record field, and a human reviewer may select among the candidates during human review. The received selection, upon receipt, may be applied to the corresponding conveyance record.

In some embodiments, the language processing models may include a language processing model based, at least in part, on hand-coded rules. Examples of such rules may include regular expressions (e.g., look for the text "hereby referred to as Grantor," extract the closest preceding proper noun, and designate the field "grantor" as equal to the extracted value in a record for the instrument), nested if-then-else statements (e.g., decision trees), and/or other rules.

In some embodiments, the one or more language processing models may include a language processing model trained by machine-learning algorithms. A machine-learning algorithm, applied to a language processing model, may be trained, at least in part, on unstructured text documents and corresponding structured conveyance records (e.g., a collection of different instruments from a given jurisdiction and their corresponding runsheets as previously analyzed manually by a human reviewer). For instance, the documents may be tokenized, terms in (or corresponding to) conveyance records values may be detected in the documents, and n-grams of varying length (e.g., 2-grams, 3-grams, and 4-grams) within a threshold distance of the detected values may be scored based on the number of times they appear in a similar spaced relation to the corresponding value in other documents. For instance, the term "hereby conveys" may frequently follow the name of the grantor, causing that 2-gram to score relatively highly. The resulting rules, e.g., n-gram plus a distance to a value, may be weighted for each value extracted, and the rules may be applied to new documents outside of the training set. Terms may be extracted according to the weight afforded by such rules, e.g., the term before "hereby conveys" may be scored relatively highly for the value of grantor in a conveyance record and selected based on which term has the highest weight.

Extracting conveyance records may include extracting only some parameters of such records and extracting likely candidate values for such parameters. In some cases, natural language processing may be sufficient to extract, for example, four of eight parameters of a conveyance record, and other parameters may be supplied by a human reviewer. In some cases, extracting conveyance record parameters may include identifying a set of candidate values, ranking the candidate values according to likelihood of being the correct value as scored by the language processing model, and associating the ranking with the conveyance record, such that a human reviewer may select among the same. In some cases, the extracted values may be incorrect, but even extracting values that are correct 40% of the time is expected to result in time savings for human reviewers, who often manually enter such values 100% of the time with traditional systems.

In some embodiments, training a given language processing model may be based on a combination of machine-learning algorithms and hand-coded rules. For example, a training set for a language processing model may include features that are based on hand-coded rules and weights that are learned based on training data. Combining machine-learning algorithms and hand-coded rules is described in Michael Curtotti and Eric Mccreath, Corpus Based Classification of Text in Australian Contracts, Proceedings of Australasian Language Technology Association Workshop, 18-26 (2010), which is incorporated by reference in its entirety and is included in the file of the parent application, U.S. patent application Ser. No. 14/681,719, now issued as U.S. Pat. No. 9,251,139.

In some embodiments, a training set of conveyance records and documents from which the conveyance records were manually populated may be subsampled into a plurality of subsamples. A plurality of language processing models may be trained based on the subsamples. One or more structured conveyance records may be extracted using the plurality of language processing models trained based on the subsamples. The one or more structured conveyance records may be aggregated into an aggregated structured conveyance record.

Record extraction component 122 may be configured to extract one or more conveyance records for a given real property. In some embodiments, record extraction component 122 may be configured to extract one or more conveyance record values, or entire records, based on the one or more sets of data describing one or more conveyances of interest in the real property obtained by access component 116. In some embodiments, extraction of the one or more conveyance records may be performed, at least in part, by applying the one or more language processing models for individual documents selected by language processing models component 120. In some embodiments, record extraction component 122 may be configured to extract, for each of the documents obtained by access component 116 (e.g., for those documents that OCR'd sufficiently clearly), from the respective OCR-produced English language text describing, in unstructured form, one or more conveyances of interest in the real property, one or more conveyance records (or other structured data) from each of the plurality of documents by applying the language processing model selected for the respective document based on the jurisdiction associated with the document. In some embodiments, each extracted conveyance record identifies one or more of a plot of land in which an interest is conveyed by the respective document, a grantor of the conveyance, a grantee of the conveyance, or the interest conveyed, and/or identifies other interest-related information of the real property.

In some embodiments, the extracted conveyance records may include links to supporting documents, or parts of documents, from which the conveyance records are extracted. In some cases, while applying the language models, upon detecting a term for which a value is to be extracted, embodiments may insert metadata flagging the term (like a PDF bookmark) and store, in association with the extracted value, a link to the corresponding part of the document. For example, a title flow may include links to individual documents, or individual parts of individual documents, that were used to extract the conveyance records in the title flow. Such links may provide supporting documents, for the conveyance records, that can be accessed and reviewed. In some embodiments, extracting a conveyance record from a plurality of documents may include detecting a conveyance record parameter (e.g., name, date, jurisdiction, type of document, etc.) on a given document. Record extraction component 122 may be configured to insert an anchor into a PDF file depicting the supporting document, or part of the supporting document, from which the conveyance record parameter is detected. Record extraction component 122 may be configured to associate a link to the PDF file and the anchor, with the detected parameter in the conveyance record. In another example, the portion of the document including the term upon which an extracted value is based may be excerpted, e.g., by rendering the document and storing an image file depicting the corresponding portion of the document with an identifier associated with the extracted value.

A link, e.g., either to the image file or bookmark, may be sent to a human reviewer who checks the result of the analysis, and the human reviewer, if unsure of the result, may select the link to relatively quickly navigate to a likely relevant document and/or portion of the document. Upon receiving an indication that a human reviewer (e.g., an attorney) has selected such a link, some embodiments may server the corresponding content and update the corresponding conveyance record with corrections from the reviewer. The extracted conveyance records may be accessed by users and/or one or more components within or outside computing environment 100. For example, the extracted records may be accessed by a user for review. The extracted conveyance records may be corrected, edited, changed, and/or updated. It should be noted that accessing and/or editing the conveyance records may require permission to access and/or edit.

Some embodiments may include a mobile application to facilitation the acquisition of information for constructing ownership graphs and conveyance records. Analysts and other users may launch the application on their mobile device (e.g., smart phone, or other portable device having a power supply, wireless connectivity, a camera, a processor and memory), and the mobile application may capture images to create the records described herein and, in some cases, expedite the capture of such data.

In some cases, the mobile device 126 may be a smartphone having an operating system and components including a processor, memory, a cellular network interface, a local area network interface, an accelerometer, a touchscreen, a camera, a location-detection module (e.g., global positioning system sensor), and a battery. In some cases, the mobile device may store in tangible, non-transitory, machine-readable memory, instructions for an application by which images of paper documents recorded in a county land office are captured.

In some embodiments, an analyst may travel to a county land office and launch the application. In some embodiments, the application may detect the current geographic location and suggest to the user an identifier of a county land office, e.g., based on corresponding geofences of land offices stored in memory or obtained from server 114. The selected land office may then be associated with images captured and used as part of the above-described metadata in some cases. In some cases, the analyst may also select a project or workflow that is being serviced, and a corresponding identifier may also be associated with the images for tracking a workflow and/or associating the images with a property right being investigated.

Next, the analyst may position a camera of the mobile device such that a piece of paper of a recorded document conveying a land right is positioned in the field of view. A variety of techniques may be used by the application when capturing an image of the page. In some cases, the application may evaluate whether the quality of an image in the field of view is sufficient before registering the image for the page. Some embodiments may calculate a brightness histogram of the image and ascertain whether more than a threshold amount of pixels are at a minimum or maximum brightness. Some embodiments may apply an edge detection algorithm and integrate the edges detected over the field of view to ascertain whether the image is in focus and property lit (e.g., whether more than a threshold amount of edges are detected). In some cases, the quality test may include detecting features corresponding to the four corners of a page and determining whether such features are more than a threshold amount of pixels apart to ascertain whether the page is too far away to capture an image of sufficient quality to OCR. In response to satisfying such a quality test, some embodiments may register the image, e.g., capture and store in memory for upload to server 114.

In some embodiments, analysts may need to capture a relatively large number of such images for many pages of many documents, e.g., on the order of hundreds of pages for a single property in some cases. To expedite this work, some embodiments of the mobile application may monitor frames from the camera and determine when the frame includes a new page (i.e., different from a page previously registered) with sufficient quality. In some cases, a previous page registered may be stored in memory and compared to the current page in the field of view. Prior to comparing pages, some embodiments may rotate, normalize, and scale one of the images, e.g., to align features corresponding to corners of the pages, and deltas between the rotated, normalized, scaled images may be calculated and compared to a threshold to ascertain whether a new page is displayed (e.g., whether more than a threshold amount of pixels are different).

In some cases, page detection may be automatically engaged by the application based on signals from an accelerometer of the mobile devices polled by the mobile application. In some cases, upon detecting an accelerometer reading indicating that the camera is pointed downward or within some threshold angle of downward, embodiments may automatically begin ascertaining whether the field of view includes a new page. Upon detecting a new page, some embodiments may register the page and store the page in a buffer for transmission to the server 114 for OCR.

In some cases, server 114 includes an OCR module (such as a modeling including the Tesseract optical character recognition engine) and supports an API by which images of pages and associated data may be uploaded for input into the pipeline described above. In some cases, the images of pages may be sent over cellular connections, or in some cases, embodiments of the mobile application may detect whether the mobile device is connected to a wireless local area network before transmitting images to save cellular bandwidth.

In some cases, groups of images corresponding to documents may be detected from the images of pages by server 114 by detecting that consecutive page numbers appear in documents and designating a first page in a new string of consecutive pages as corresponding to a new document. Or in some cases, an analyst may manually input into the mobile application a signal indicating that an image should be captured and data indicating when documents start and stop among a sequence of images, which is not to suggest that other features may not also be omitted in some embodiments.

In some cases, data in images of pages may be detected by the mobile application or the server 114 and used to expedite review of documents while the analyst is at the courthouse. For instance, often such pages include a volume and page number. In some cases, embodiments may suggest a range of volumes and page numbers over which to look for a next document. For example, some embodiments may detect that a particular document pertains to a human entity, rather than a corporation, and calculate an estimated volume and page number corresponding to the end of a typical or maximum human life span. To this end, some embodiments of server 114 may store in memory a time series for each county with volume/page and date pairs based on received documents. Upon determining a date for a new document, and that the document is a grant to a human, embodiments (e.g., server 114 or the mobile application) may calculate a date upon which the person would likely to have divested themselves of the interest (e.g., in a will), and access the time series to identify a likely volume and page number corresponding to the date. Some embodiments may interpolate such a date based on a rate of increase in volume and page number and date before and/or after the date at issue. The date may be displayed to the user of mobile device 126 as a suggested upper bound of a range in which to search for a next conveyance.

In some cases, such estimates may be obtained based on external sources, e.g., death dates for specific grantees listed in such documents may be obtained by submitting a query to the Social Security Death Index and receiving a responsive date of death. In some cases, social security numbers may detected in (e.g., based on satisfying a regular expression of (^\d{3}-?\d{2}-?\d{4}$|^XXX-XX-XXXX$)) and extracted from the documents and submitted in such a query. The external sources may also be used to close a break in a title chain. A social security number or other identifier (e.g., name and address) may be submitted to the Social Security Death Index or other service (such as LexisNexis™), and a location of death may be obtained in response. The location may be used to search probate records in other states to obtain leads to identify heirs. The search may be performed automatically, e.g., when a break in a title chain is detected, and suggested locations for probate records (with links to supporting data sources) may be presented in the user interfaces described above adjacent the corresponding records.

These external sources may also be queried by some embodiments to detect likely inaccurate records in a title chain. For instance, embodiments may detect conveyance from (or the absence of conveyances from) a human grantee in a title chain after a maximum human lifespan (e.g., 120 years) or after a known death of the grantee obtained with the above-noted queries to external sources. Such records may be flagged in the user interfaces described herein, e.g., with a different visual weight, and a link to supporting data.

To determine whether a grantee is a human, some embodiments may search the information extracted for the grantee for terms appearing in a dictionary of known non-person entities, e.g., "Inc.," "Incorporated," "Trust," "LLP," "Limited Liability Corporation," "Corporation," and the like. Upon detecting the absence of such terms, some embodiments may perform the verifications described above.

To facilitate the operations described above, in some cases, the mobile application may include a metadata assignment module that associates images with the above-described metadata, new-page detection module that determines when to capture images of new pages, a page image buffer that stores images of pages to upload to server 114 (or in some cases, OCR may be performed by the mobile application), and a next volume estimator.

Figure 2A:
FIG. 2A shows an example of a portion of a graphical user interface depicting title flow title chains produced by computing environment 100 of FIG. 1, in accordance with some implementations of the system of FIG. 1.
Figure 2B:
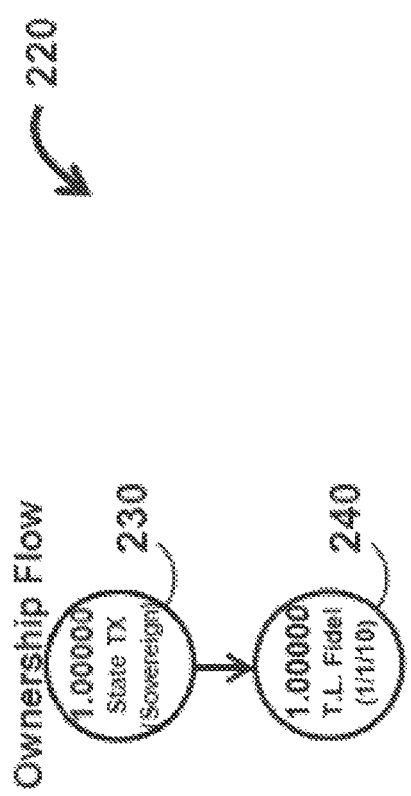
FIG. 2B shows another portion of a graphical user interface of FIG. 2A depicting ownership flow, in accordance with some implementations of the system of FIG. 1.
Figure 3B:
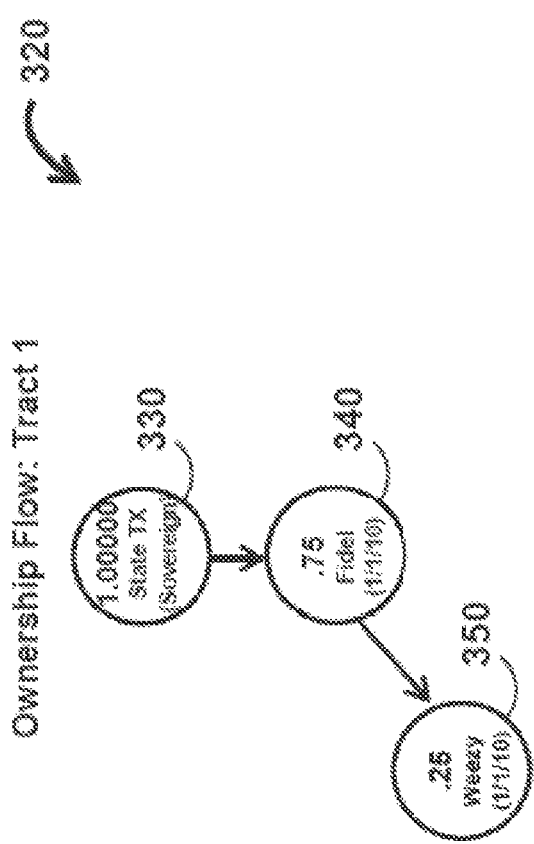
FIG. 3B shows an example of a portion of a graphical user interface from FIG. 2B after adding a conveyance record.

The resulting conveyance records from system 108 may be presented for human review and edits in a variety of formats. Two examples are shown in FIGS. 2A-2B and 3A-3B: a runsheet entry and a title flow. FIG. 2A shows a runsheet entry, at 210, depicting conveyance records from the state of Texas to the party labeled "Fidel." The examples of FIGS. 2A-2B and 3A-3B are relatively simple to facilitate explanation, but in practice, the visualizations and associated data are expected to be much more complex, e.g., as interests in land have increasingly fractured over time. The record instrument in this example is a patent. Also shown in FIG. 2B is a title flow depicting the same conveyance record as a directed graph, in the form of tree 220, from a sovereign entity 230, in this case, the state of Texas, to the current owners 240, in this case, the party labeled "Fidel," in the position of leaf nodes. FIGS. 3A-3B depicts a runsheet entry and a title flow views with an additional conveyance record from the party labeled "Fidel" to the party labeled "Weezy." FIG. 3A shows a runsheet entry, at 310, depicting a conveyance record from the party labeled "Fidel" to the party labeled "Weezy." The record instrument in FIGS. 3A-3B is a general warranty deed. Also shown in FIG. 3B is a title flow depicting the same conveyance record as a directed graph, in the form of tree 320, from the sovereign entity 330, to the party 340 labeled "Fidel", and from the party 340 to the party 350 labeled "Weezy."

To facilitate edits or entries of new values, some embodiments may support term completion and suggestion. Upon or prior to a user entering a new value in a field, embodiments may send to a client device a list of suggested values, e.g., based on a partially entered stem entered by a user and reported back to system 108 by a client device, or based on likely relevant values selected according to a conveyance record being reviewed. In some cases, such suggestions may be selected based on an edit distance between the current value and another value appearing in a title chain (e.g., to minimize the edit distance between a surname in an earlier or later conveyance record and a conveyance record at issue in which an OCR error misinterpreted a character.)

In some cases, the visual state of the user interfaces of FIG. 2A-2B or 3A-3B, showing different representations of conveyance records, may be linked by instructions sent by server 114. For instance, the runsheet and title flow visualization may be linked such that when a runsheet entry is selected in one window (e.g., in an i-frame, tab, or browser window), the state of another window may be updated to highlight and display (e.g., center upon) a corresponding node in the title flow, and vice versa. Further, updates to values in each depiction may be propagated through to the other depiction. In cases in which a single browser instance depicts both views, e.g., in separate div boxes, such updates may be passed through updates to client-side program state. Or in some cases (including cases in which multiple browser instances are used), such updates may be sent to server 114, which may push an update to the other browser instance, e.g., via a WebSocket connection. In some cases, the two views may be displayed on two different computing devices, e.g., in one view sent to a tablet computer and another view sent to a laptop, with the two views synchronized by server 114 or via peer-to-peer communications, like via browser-to-browser WebRTC data exchanges (which may be initialized by server 114). Showing both views is expected to expedite review of work performed by others and facilitate collaboration on title flows, e.g., reviewers using these embodiments may relatively quickly navigate to relevant runsheet entries by clicking on corresponding nodes of a title flow. That said, not all embodiments necessarily provide this benefit, which is not to suggest that other features may not also be omitted in some cases.

In some embodiments, server 114 may be operative to receive an image of a manually created title flow, e.g., a scan or photograph of a title flow created on paper, and some embodiments may overlay the presently described user interfaces and information for title flows on the image. In some cases, handwritten notes in the nodes of such an image may be recognized with optical character recognition, and based on values in the notes, such as a grantor name or date, some embodiments may automatically associate conveyance records with the corresponding nodes.

In some cases, a given plot of land input into the system may have various portions subject to different ownership. For instance, a plot of land may have been divided into a western half and an eastern half in a will several generations prior, and the two different halves may then have different branches of a title flow pertaining to geographically different pieces of land. Some embodiments of server 114 may be operative to render maps, color-coding geographic areas subject to different sets of owners to facilitate selection of owners to contact for leases and site selection for oil and gas wells.

FIGS. 4A-4B illustrate an example of conveyance records in the form of a runsheet. As shown in FIG. 4A, which depicts a first part of the runsheet, the runsheet includes instrument numbers at column 402, instrument types at column 404, record types at column 406, grantor's information at column 408, and grantee's information at column 410. FIG. 4B depicts the second part of the runsheet. FIG. 4B includes descriptions of interest at column 412, execution dates at column 414, effective dates at column 416, filing dates at column 418, document problems/notes at column 420, and title notes at column 422.

In some embodiments, updates to the conveyance records may be stored and used to re-train, score, and/or rank the language processing models. The language processing models may be scored and/or ranked to identify stronger models, weaker models, accurate models, wrong models, and/or to identify other attributes of the language processing models. For example, language processing models may be scored and/or ranked based on the level of accuracy of the conveyance records extracted. In some embodiments, language processing models component 120 may be configured to select new language processing models based on the language processing models scores and/or ranks. Record extraction component 122 may be configured to extract new conveyance records and/or update previous conveyance records based on the new selected language processing models.

Recommendations component 124 may be configured to generate recommendations and/or alerts. The recommendations and/or alerts may be based on the extracted conveyance records. In some embodiments, the recommendations and/or alerts may be based on the selected language processing model. In some embodiments, the recommendations and/or alerts may be based on conveyance records parameters. For example, the recommendations generated by recommendations component 124 may include recommendations to provide supplemental documents, to correct discrepancies between documents, to correct ownership in cases where 100% ownership of a type of interest is not documented, to correct one or more conveyance records parameters (e.g., names, dates, addresses, etc.), to change language processing models, and/or other recommendations and/or alerts.

As noted above, in some embodiments, the conveyance records pertaining to a plot of land may form directed graph data structure, such as an ownership tree. Some embodiments may be configured to interrogate the tree to detect compliance with various graph validity rules, such as compliance with a rule that 100% of ownership of each type of interest (e.g., mineral rights, full ownership, etc.) is accounted for among leaf nodes, and compliance with a rule that a party can only convey that interest which they held at the time of the conveyance. To detect compliance with a rule of 100% ownership, some embodiments may recurse the ownership tree, starting with a root node where ownership was granted by a sovereign entity, determine what is conveyed in each edge, and confirm that interests residing in leaf nodes correspond to 100% ownership in the aggregate. Some embodiments may detect conveyances for which the conveying party did not possess the interest conveyed such as, for example, a node in which a party sold an interest that they had previously sold.

Some embodiments may interrogate the ownership graph to track ownership of different types of interests in the land at issue. In some cases, a hierarchy of interests may be stored in memory, with interests that are, unless otherwise indicated, part of the interest being designated as subcomponents of the interest at issue. For example, mineral rights may be a child interest of a fee simple interest in the hierarchy, which is not to imply that mineral rights are not severable, but merely indicates that such rights may be part of a fee simple interest until severed. Some embodiments may track each of these different types of interest according to the hierarchy of interests, for instance, detecting a node in which mineral rights are severed from surface rights, maintaining separate inventories, and separately applying the graph validity rules, for mineral rights and surface rights for subsequent nodes.

Conveyance records that result in a violation of ownership graph validity rules may be associated with alarm designations identifying the type of violation. When sending instructions to display the conveyance records, e.g., in the format of FIG. 2A-2B or 3A-3B, embodiments may send instructions to depict problematic conveyances differently, e.g., with a different visual weight (e.g., color, font, shadow, transparence, size, shape, etc.) corresponding to the type of violation of the graph validity rules. In some cases, e.g., upon receiving edits to a parameter of a non-leaf node, some embodiments may propagate the change to child nodes of the ownership graph. For instance, upon receiving an edit indicating that a given document conveys only a 50% interest in mineral rights, rather than a 100% interest, to a given grantee, some embodiments may reduce by half an amount conveyed in subsequent nodes in the ownership graph downstream from the node terminating the conveyance that was edited. Propagating such changes automatically is expected to reduce reviewer time relative to systems that did so manually. That said, not all embodiments necessarily provide this benefit, as other aspects are independently useful.

To facilitate collaboration around such edits, some embodiments of server 114 may receive, organize, and send instructions to display comments on ownership graphs (e.g., title flows), branches of ownership graphs, or edges or nodes of such graphs. In some cases, runsheet entries and title flows may be presented with inputs by which a user may add or respond to comment on such a component, and embodiments may maintain and send instructions to display on client devices threaded conversations pertaining to portions of the ownership graph. Tracking such communications in this fashion is expected to expedite subsequent review, in some cases years later, when users attempt to understand the reasoning underlying a particular designation.

Figure 6:
FIG. 6 shows an example of a graphical user interfaces associated with computing environment 100 of FIG. 1, in accordance with some implementations of the system of FIG. 1.

FIGS. 5-6 illustrate examples of a graphical user interface associated with computing environment 100, in accordance with one or more embodiments.

Figure 7:
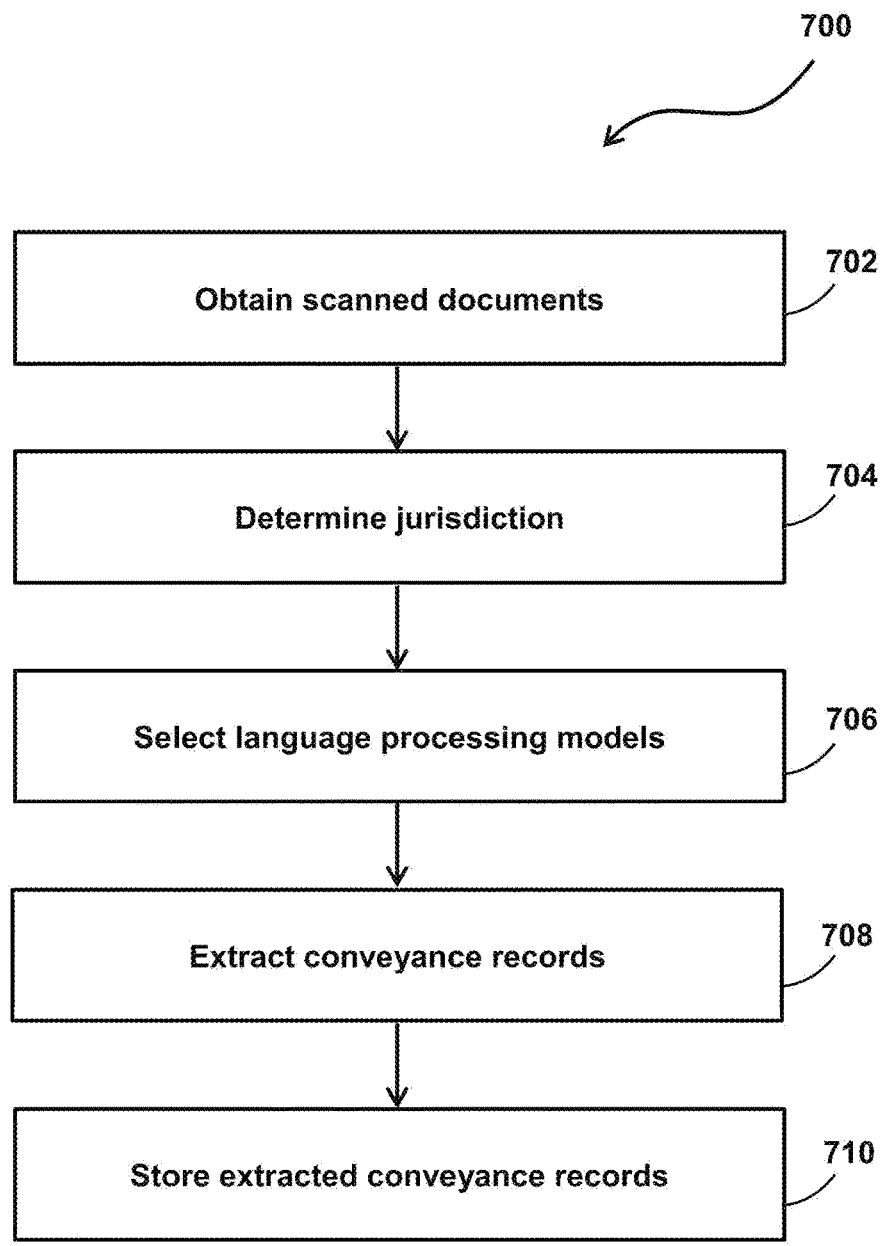
FIG. 7 shows an example of a process for extracting conveyance records from unstructured text documents.

FIG. 7 illustrates a method 700 for extracting conveyance records from unstructured text documents in accordance with one or more embodiments. The operations of method 700 presented below are intended to be illustrative, which is not to imply that the above discussion is intended to be limiting. In some embodiments, method 700 may be accomplished with one or more additional operations not described and/or without one or more of the operations discussed, which is not to imply that any other component is limited to the features described. Additionally, the order in which the operations of method 400 are illustrated in FIG. 7 and described below is not intended to be limiting, which is not to imply that any other component is limited to the features described.

In some embodiments, one or more implementations of method 700 may be implemented in one or more physical processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to machine-readable instructions stored electronically on one or more electronic storage mediums. The one or more physical processing devices may include one or more devices configured through hardware, firmware, and/or software to be specifically designed for execution of one or more of the operations of method 700.

Referring to FIG. 7, at an operation 702 of method 700, one or more unstructured, machine-readable sets of data describing one or more conveyances of interest in real property may be obtained. In some embodiments, the one or more sets of data may be a plurality of scanned documents. In some embodiments, the plurality of scanned documents may be optical-character-recognized (OCR) documents, each having OCR-produced English language text describing, in unstructured form, one or more conveyances of interest in real property. In some embodiments, one or more documents may be associated with metadata identifying a jurisdiction in which the respective real property is located. In some embodiments, operation 702 may be performed by an access component the same as or similar to access component 116 (shown in FIG. 1 and described herein).

At an operation 704, a jurisdiction and/or date for the one or more unstructured sets of data describing one or more conveyances of interest in real property may be determined. In some embodiments, a respective jurisdiction and/or date for each of the documents obtained at operation 702 may be determined. Determination of a respective jurisdiction and/or date for each of the documents may be based on the metadata associated with each of the documents. In some embodiments, jurisdiction and/or date for a given document may be determined, at least in part, based on data obtained from a user, one or more components within and/or outside of computing environment 100, and/or other sources of data. In some embodiments, operation 704 may be performed by a jurisdiction determination component the same as or similar to jurisdiction determination component 118 (shown in FIG. 1 and described herein).

At an operation 706, a respective language processing model for each of the documents may be selected from a plurality of language processing models for the English language, e.g., a collection of the documents from a given jurisdiction, at a given time, authored by a given law firm, may be input to the same language processing model, and a different collection sharing such attributes may be input to a different language processing model. Selection of language processing models for each document may be based on the respective determined jurisdiction and/or date. The selected language processing models may include a first language processing model selected for at least some of the documents associated with a first jurisdiction and/or a first date, and a second language processing model, different from the first language processing model, selected for at least some of the documents associated with a second jurisdiction, and/or a second date that is different from the first jurisdiction, and/or the first date. Each language processing model may be configured to extract structured data from unstructured text. Each language processing model may be configured to detect different terminology used in different jurisdictions, and/or different dates, with different frequencies. In some embodiments, operation 706 may be performed by a language processing models component the same as or similar to language processing models component 120 (shown in FIG. 1 and described herein).

At an operation 708, a plurality of structured conveyance records may be extracted for each of the documents from the respective OCR-produced English language text describing, in unstructured form, one or more conveyances of interest in real property. The plurality of structured conveyance records may be extracted by applying the language processing model selected for the respective document based on the jurisdiction and/or date associated with the document. Each extracted conveyance record may identify a plot of land in which an interest is conveyed by the respective document, may identify a grantor of the conveyance, may identify a grantee of the conveyance, and/or may identify the interest conveyed. In some embodiments, operation 708 may be performed by a record extraction component the same as or similar to record extraction component 122 (shown in FIG. 1 and described herein).

At operation 710, the extracted structured conveyance record may be stored in memory. In some embodiments, operation 710 may be performed by a storage component the same as or similar to electronic storage 115 (shown in FIG. 1 and described herein).

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the accompanying drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning "having the potential to"), rather than the mandatory sense (i.e., meaning "must"). The words "include," "including," and "includes,"

and the like, mean "including, but not limited to." As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification, discussions utilizing terms such as "processing," "computing," "calculating," "determining," and/or the like, refer to actions or processes of a specific apparatus, such as a special purpose computer or a similar special purpose electronic processing/computing device.

Additional examples will be better understood in view of the following enumerated embodiments:

1) A method of obtaining images of documents depicting conveyances of interests in real property, the method comprising:
   obtaining, with a mobile device, an identifier of a county land office in which images of documents are to be captured;
   receiving an image from a camera of the mobile device depicting a page of a document recorded in the county land office;
   associating the image with the identifier; and
   sending the image and the identifier to a remote property rights management system.
2) The method of embodiment 1, comprising:
   determining whether the image depicts the page of text with sufficient quality.
3) The method of embodiment 1, comprising:
   detecting edges in the image and calculating an aggregate score based on the detected edges.
4) The method of embodiment 1, comprising:
   detecting features corresponding to corners of the page;
   determining whether at least some of the features are more than a threshold amount of pixels apart.
5) The method of embodiment 1, wherein obtaining an identifier of a county land office comprises:
   obtaining a current geographic location of the mobile device;
   automatically selecting one or more candidate land offices from among a plurality of county land offices based on the geographic location.
6) The method of embodiment 1, comprising:
   automatically determining that a page is depicted in a field of view of the camera of the mobile device; and
   in response to the determination, registering an image of the page.
7) The method of embodiment 1, comprising:
   automatically determining that a new page, different from a previous page, is depicted in a field of view of the camera of the mobile device; and
   in response to the determination, registering an image of the page.
8) The method of embodiment 1, comprising:
   extracting a volume identifier from the image;
   estimating a next potentially relevant volume based on the extracted volume identifier; and
   presenting the next potentially relevant volume to a user.
9) The method of embodiment 1, comprising:
   buffering a plurality of images including the image; and
   detecting a network connection that is not a cellular network, wherein sending the image is performed in response to detecting the network connection.
10) The method of embodiment 1, wherein:
   the mobile device is a cell phone and comprises an operating system executing on a processor and stored in memory.
11) A mobile device, comprising:
   one or more processors; and
   memory storing instructions that when executed by at least some of the processors effectuate operations comprising the steps of any of embodiments 1-10.
12) A tangible, non-transitory, machine-readable medium storing instructions that when executed by a data processing apparatus effectuate operations comprising the steps of any of embodiments 1-10.

What is claimed is:
1. A method of processing conveyance information obtained from repositories of unstructured data in county land offices, the method comprising:
   obtaining and storing, with one or more processors, scanned documents having unstructured natural language text, each having at least some text describing one or more conveyances of interest in real property;
   extracting, with one or more processors, with a natural language processing model, from the unstructured natural language text, parameters of a conveyance record, wherein:
      the natural language processing model is responsive to features detected in unstructured natural language text based on hand-coded pattern-matching rules; and
      the natural language processing model is trained by operations that comprise:
         obtaining a training set of training documents and corresponding training records, the corresponding training records having respective conveyance record parameters appearing in the training documents, and
         learning weights of the natural language processing model by training the natural language processing model to extract at least some conveyance record parameters based on the training set and features detected in the training documents based on the hand-coded pattern-matching rules;

obtaining and storing, with one or more processors, an ownership flow of an interest in real property described by at least some of the documents, the ownership flow including a plurality of conveyances in a conveyance graph, and the ownership flow including at least some of the extracted parameters;

receiving, from a client computing device, with one or more processors, a request to view the ownership flow, the request identifying the interest in real property;

applying, with one or more processors, ownership graph rules to the ownership flow to identify conveyances in the ownership flow that violate one or more of the rules;

sending, to the client computing device, with one or more processors, instructions to display the ownership flow with an indication of a conveyance violating one or more of the rules;

receiving, from the client device, with one or more processors, a command to edit the ownership flow to comply with the violated rule;

in response to the command, with one or more processors, storing an updated ownership flow reflecting the edit;

after storing the updated ownership flow, receiving, with one or more processors, another request to view the ownership flow; and sending, with one or more processors, instructions to display the updated ownership flow reflecting the edit.

2. The method of claim 1, wherein at least one hand-coded pattern-matching rule is a regular expression or nested conditional statement and at least some of the conveyance record parameters are extracted based on the hand-coded pattern-matching rules.

3. The method of claim 1, further comprising encoding the conveyance record in a standardized format, wherein the standardized format comprises key-value pairs that encode the extracted parameters of the conveyance record in JavaScript object notation (JSON) or extensible markup language (XML).

4. The method of claim 1, wherein each document is associated with a geolocation based on signals sensed by a mobile device used to scan the documents, the geolocation indicating a location of the documents at the time of scanning.

5. The method of claim 4, comprising verifying data manually entered structured data pertaining to a document for consistency with the geolocation associated with the document.

6. The method of claim 1, comprising:
receiving, from a client computing device, a request for owners of a type of interest in a geographic area; and
composing a response including a corresponding lists of owners; and
sending, to the client computing device, the corresponding list of owners.

7. The method of claim 6, wherein composing a response comprises identifying leaf nodes of an ownership graph.

8. The method of claim 1, comprising:
receiving, from a client computing device, a request for conveyance records listing a given party as a grantor or grantee;
composing a response including responsive conveyances; and
sending, to the client computing device, at least some of responsive conveyances.

9. The method of claim 1, comprising:
for at least a plurality of parties listed in the ownership flow, searching for other ownership flows listing the respective parties as a grantee or grantor; and sending identifiers of responsive, other ownership flows to the client computing device.

10. The method of claim 9, wherein sending identifiers of the other ownership flows to the client computing device comprises:
sending links to images of documents effecting corresponding transfers of ownership.

11. A system, comprising:
one or more processors; and
memory storing instructions that when executed by at least some of the processors effectuate operations comprising:
obtaining and storing scanned documents having unstructured natural language text, each having at least some text describing one or more conveyances of interest in real property;
extracting, with one or more processors, with a natural language processing model, from the unstructured natural language text, parameters of a conveyance record, wherein:
the natural language processing model is responsive to features detected in unstructured natural language text based on hand-coded pattern-matching rules; and
the natural language processing model is trained by operations that comprise:
obtaining a training set of training documents and training records, the corresponding training records having respective conveyance record parameters appearing in the training documents, and
learning weights of the natural language processing model by training the natural language processing model to extract at least some conveyance record parameters based on the training set and features detected in the training documents based on the hand-coded pattern-matching rules;
obtaining and storing an ownership flow of an interest in real property described by at least some of the documents, the ownership flow including a plurality of conveyances in a conveyance graph;
receiving, from a client computing device, a request to view the ownership flow, the request identifying the interest in real property;
applying ownership graph rules to the ownership flow to identify conveyances in the ownership flow that violate one or more of the rules;
sending, to the client computing device, instructions to display the ownership flow with an indication of a conveyance violating one or more of the rules;
receiving, from the client device, a command to edit the ownership flow to comply with the violated rule;
in response to the command, storing an updated ownership flow reflecting the edit;
after storing the updated ownership flow, receiving another request to view the ownership flow; and
sending instructions to display the updated ownership flow reflecting the edit.

12. The system of claim 11, wherein at least one hand-coded pattern-matching rule is a regular expression or nested conditional statement and at least some of the conveyance record parameters are extracted based on the hand-coded pattern-matching rules.

13. The system of claim 11, further comprising encoding the conveyance record in a standardized format, wherein the standardized format comprises key-value pairs that encode the extracted parameters of the conveyance record in JavaScript object notation (JSON) or extensible markup language (XML).

14. The system of claim 11, wherein each document is associated with a geolocation based on signals sensed by a mobile device used to scan the documents, the geolocation indicating a location of the documents at the time of scanning.

15. The system of claim 14, comprising verifying data manually entered structured data pertaining to a document for consistency with the geolocation associated with the document.

16. The system of claim 11, the operations comprising:
   receiving, from a client computing device, a request for owners of a type of interest in a geographic area; and
   composing a response including a corresponding lists of owners; and
   sending, to the client computing device, the corresponding list of owners.

17. The system of claim 16, wherein composing a response comprises identifying leaf nodes of an ownership graph.

18. The system of claim 11, the operations comprising:
   receiving, from a client computing device, a request for conveyance records listing a given party as a grantor or grantee;
   composing a response including responsive conveyances; and
   sending, to the client computing device, at least some of responsive conveyances.

19. The system of claim 11, the operations comprising:
   for at least a plurality of parties listed in the ownership flow, searching for other ownership flows listing the respective parties as a grantee or grantor; and
   sending identifiers of responsive, other ownership flows to the client computing device.

20. The system of claim 19, wherein sending identifiers of the other ownership flows to the client computing device comprises:
   sending links to images of documents effecting corresponding transfers of ownership.

21. The method of claim 1, wherein applying ownership graph rules to the ownership flow to identify conveyances in the ownership flow that violate one or more of the rules comprises:
   steps for interrogating the a directed graph to detect compliance with graph validity rules.

22. The method of claim 1, wherein applying ownership graph rules to the ownership flow to identify conveyances in the ownership flow that violate one or more of the rules comprises:
   determining that 100% of ownership of a type of interest is accounted for among leaf nodes of the conveyance graph.

23. The method of claim 1, wherein applying ownership graph rules to the ownership flow to identify conveyances in the ownership flow that violate one or more of the rules comprises:
   determining that 100% of ownership of each of a plurality of different types of interest are accounted for among leaf nodes of the conveyance graph.

24. The method of claim 1, wherein applying ownership graph rules to the ownership flow to identify conveyances in the ownership flow that violate one or more of the rules comprises:
   for each of a plurality of conveyances in the ownership flow, detecting compliance with a rule that a party can only convey that interest which they held at the time of the conveyance.

25. The method of claim 1, wherein applying ownership graph rules to the ownership flow to identify conveyances in the ownership flow that violate one or more of the rules comprises:
   detecting a severing conveyance in the conveyance graph in which mineral rights are severed from surface rights;
   in response to detecting the severing conveyance, maintaining different inventories for mineral rights and surface rights and separately applying at least some ownership graph validity rules to the different inventories; and
   associated a conveyance record that results in a violation of at least one ownership graph validity rule with an alarm designation identifying a type of the violation.

26. The method of claim 1, comprising: steps for managing mineral rights.

* * * * *